Jan. 23, 1945.    J. W. WANNER    2,367,909
PLATING FIXTURE
Filed Feb. 16, 1942
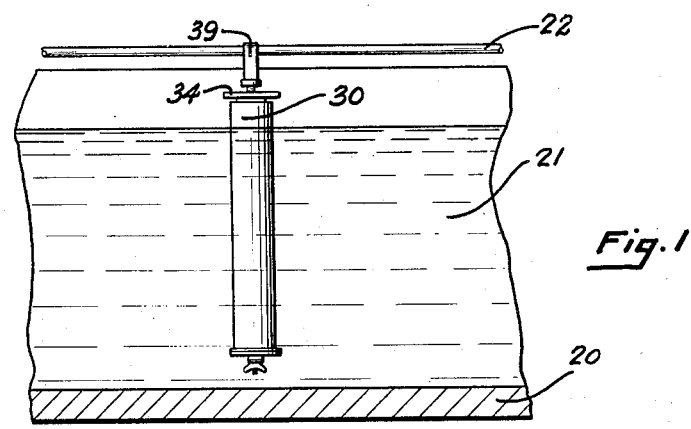
Fig. 1
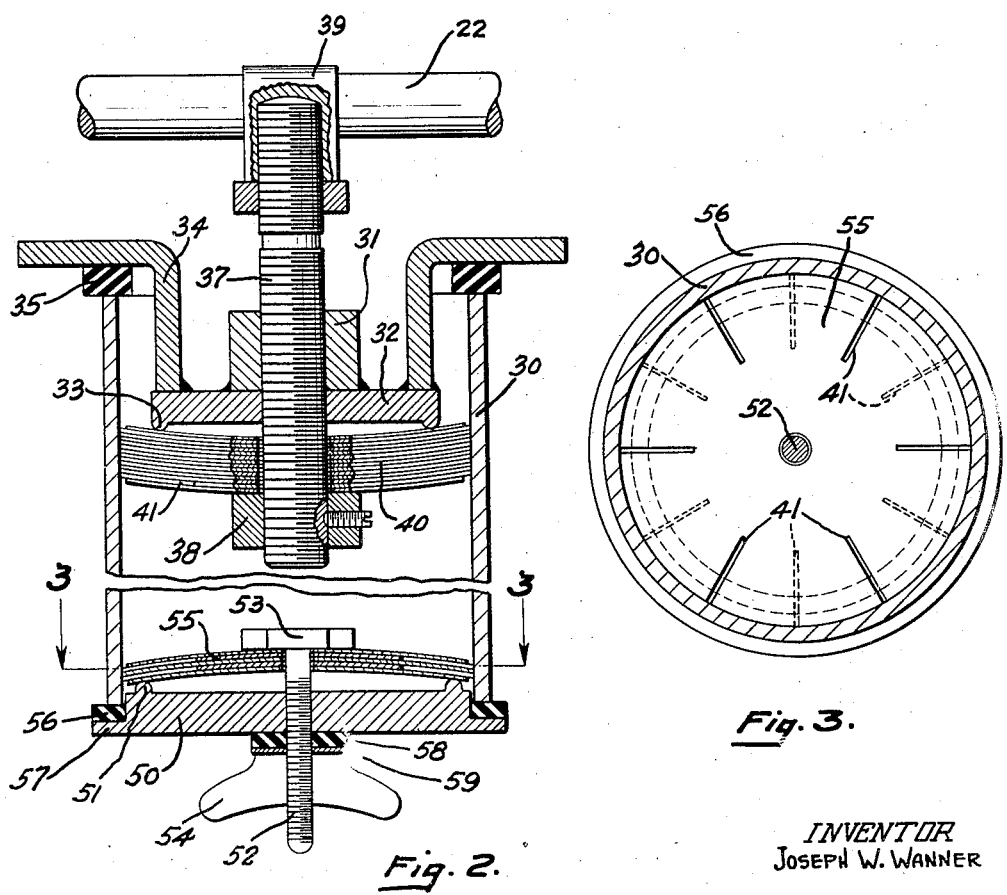
Fig. 2.
Fig. 3.
INVENTOR
JOSEPH W. WANNER
his ATTORNEYS Patented Jan. 23, 1945

2,367,909

UNITED STATES PATENT OFFICE 2,367,909

PLATING FIXTURE

Joseph W. Wanner, Dayton, Ohio, assignor to General Motors Corporation, Detroit, Mich., a corporation of Delaware Application February 16, 1942, Serial No. 431,127

2 Claims. (Cl. 248—309)

This invention relates to improvements in devices for suspending tubular members and is particularly adapted for use in the plating art where tubular members are to be suspended in a plating bath.

One of the objects of the present invention is to provide a hanger for a tubular member which may be applied quickly and without the necessity of tools such as screw drivers, wrenches or the like.

Another object of the present invention is to provide a hanger which contacts only the inside surface of the tubular member and will not mar its finish as it is urged into gripping and good current conducting engagement therewith.

A still further object of the invention is to provide a tube suspending device which is adapted to close and seal the end of the tubular member to prevent the plating solution from reaching the interior of the tube. This is especially desirable when only the outside surface of the tubular member is to be plated.

Further objects and advantages of the present invention will be apparent from the following description, reference being had to the accompanying drawing wherein a preferred embodiment of the present invention is clearly shown.

In the drawing:

Fig. 1 is a fragmentary view of a plating tank showing a tube suspended therein by the device of the present invention.

Fig. 2 is a longitudinal, sectional view of a tubular member having the suspending and sealing device of the present invention applied thereto.

Fig. 3 is a transverse sectional view taken along the line 3—3 of Fig. 2.

Referring to the drawing the numeral 20 designates a portion of a plating tank containing a liquid 21. The rod 22, passing longitudinally over the tank 20, provides one of the electrodes from which the tubes to be plated are suspended by the device of the present invention. As illustrated in Fig. 1, the tubular member 30 is not completely immersed in liquid 21. Therefore the portion of the member not immersed will not be plated. A sealing cover is also provided at the bottom end of the tubular member 30, said cover preventing the fluid 21 from entering the member whereby only the outer surface thereof will be plated.

Fig. 2 shows the suspending and sealing members of the device applied to the tubular member 30. The suspending portion of the device as illustrated comprises a nut 31 having a flange 32 attached thereto as shown, or it may be integral therewith. The flange 32 has an annular ridge 33 on its surface opposite the nut 31. A cup-shaped operating member 34 has its one annular edge secured to the flange 32. A screw stud 37 is threadedly received by the nut 31, said stud having a head portion 38 secured thereto or being formed integral therewith. At the outer end of the screw stud 37 there is secured a hook member 39 by means of which the stud and nut assembly may be attached to the electrode rod 22 as shown in Fig. 1. A sealing gasket 35 is placed between the member 34 and the annular edge of the tubular member 30.

A plurality of discs 40, perforated centrally, are carried by the screw stud 37 between the head portion 38 of the stud and the nut-flange 32. Each disc is dished convexedly relatively to the nut-flange 32 and is made of any suitable comparatively non-abrasive, resilient metal such as for instance copper. Radial slots 41 extend from the outer edge of said disc and terminate short of the center thereof. When in stacked relation on the screw stud, the radial slots of each adjacent disc are not in alignment, but are staggered relatively to each other so as to impede the passage of fluid through the stack.

Normally, that is, when the several discs of a stack are fully relaxed and dished, the outer diameter of the stack is less than the inside diameter of the tubular member with which said stack is to be used. However, after the stack, with the stud and nut, has been inserted in the tube as shown in Fig. 2, operation of the nut 31 and its flange 32 on the stud 37 toward head portion 38 causes the annular ridge 33 of the flange to exert a pressure upon the stack of discs 40 which, resting upon the head portion 38 of the screw stud will be flattened and as they are flattened, the discs will grippingly engage the inner annular wall of the tubular member 30 permitting it to be suspended in the plating bath by the hook portion 39 provided on the screw stud 37.

The engagement of the peripheral edges of the discs 40 with the inner wall of the tubular member 30 provides for good current conductivity between the hanger assembly, suspended from the electrode 22 and the tubular member 30 immersed in the plating bath 21.

The sealing cover as illustrated in Fig. 2 comprises a disc 50 having an annular ridge 51 on its inner surface. A central opening in the disc 50, receives a screw stud 52 having a head 53 and a nut 54 thereon adjacent its outer surface. Between the head 53 and the inner, ridged surface of the disc 50, a stack of centrally perforated discs 55 such as have been described above, are provided. A sealing gasket or ring 56, of any suitable sealing material such as rubber or Duprene (a sealing material well known in the art and procurable on the open market) is provided on an annular shelf 57 of the disc 50 so that said gasket aligns and may contact with the edge of the tubular member 30.

When the assembly is placed in position on the tubular member, the stack of discs 55, smaller in diameter than the tube enter the tube. Screwing up of the nut 54 on screw stud 52 draws the head portion 53 toward the disc 50 thereby flattening the dished discs of the stack and causing the peripheral edges of the discs to grip the inner wall of the tubular member. As soon as the discs come into gripping contact with the tubular member continued turning of the nut 54 will urge the cover disc 50 toward the tube thereby causing the shelf 57 of the cover disc 50 to compress the sealing gasket between the said shelf and the adjacent edge of the tubular member which completely seals this end of the tube against the entry of any fluid into the tube. A sealing gasket 58 is placed about the screw stud 52 between the cover disc 50 and a metal washer 59 on the nut.

If the tubular member is to be plated throughout its entire length of outside surface it should be entirely immersed in the plating liquid 21. To prevent entry of the fluid, member 34 is an integral circular member secured to the flange 32. A sealing gasket may be placed between the outwardly extending flange of this cup-shaped member and the adjacent annular edge of the tubular member so that said gasket will be drawn into sealing engagement with said tube edge upon operation of the nut 31 to flatten the discs 40 thereby preventing the entry of liquid at this point. A suitable sealing washer as shown in connection with screw stud 52 may be provided on the screw stud 37.

From the aforegoing it may clearly be seen that applicant has provided a sealing hanger for tubular members which may be easily and quickly attached without use of any special tools and which securely carries the tubular member and seals it against the entry of a liquid into its interior. The device is so constructed that no parts perishable in a plating bath are used thereby permitting the device to be used again and again without any special attention being required thereby facilitating production and eliminating waste.

While the embodiment of the present invention as herein disclosed, constitutes a preferred form, it is to be understood that other forms might be adopted, all coming within the scope of the claims which follow.

What is claimed is as follows:

1. A hanger for a tubular member comprising in combination an inflexible plate; a nut on said plate; a screw-stud extending through the plate and into said nut, said stud having a head portion on the side of the plate opposite the nut; a stack of centrally perforated discs on said stud between the head portion thereof and the plate, said discs being dished convexedly relatively to the plate and having radial slots whereby when said discs are inserted into a tube and the nut operated to draw the head of the screw stud toward it said discs will be flattened causing their peripheral edges grippingly to engage the inner wall of the tubular member; and a hook member threadedly received by the screw stud at its outer end.

2. A hanger for a tubular member comprising in combination, a nut having a disc-like flange provided with an annular ridge; a screw in said nut, said screw having a hook at its outer end and a head at the opposite end which extends from the ridged side of the nut-flange; a stack of centrally perforated discs on said screw between the head thereof and the flange of the nut, said discs being radially slotted and being dished convexedly relatively to the flange of the nut, whereby operation of the nut toward the head of the screw causes the stack of discs to be clamped between the screw head and the ridge on the nut flange and flattened so that the peripheral edges of the discs engage and grip the inner surface of the tube in which the hanger was inserted.

JOSEPH W. WANNER.